United States Patent
Marquardt

(10) Patent No.: US 9,777,712 B2
(45) Date of Patent: Oct. 3, 2017

(54) WIND POWER STATION FOR ROOFTOPS

(71) Applicant: Rainer Marquardt, Berlin (DE)

(72) Inventor: Rainer Marquardt, Berlin (DE)

(*) Notice: Subject to any disclaimer, the term of this patent is extended or adjusted under 35 U.S.C. 154(b) by 311 days.

(21) Appl. No.: 14/666,333

(22) Filed: Mar. 24, 2015

(65) Prior Publication Data
US 2015/0275865 A1  Oct. 1, 2015

(30) Foreign Application Priority Data

Mar. 28, 2014 (DE) ........................ 10 2014 104 466

(51) Int. Cl.

| | | |
|---|---|---|
| *F03D 1/04* | (2006.01) | |
| *F03D 1/06* | (2006.01) | |
| *F03D 11/04* | (2006.01) | |
| *F03D 9/45* | (2016.01) | |
| *F03D 13/20* | (2016.01) | |
| *F03D 9/25* | (2016.01) | |

(52) U.S. Cl.
CPC ............... *F03D 11/04* (2013.01); *F03D 1/04* (2013.01); *F03D 1/0633* (2013.01); *F03D 1/0691* (2013.01); *F03D 9/25* (2016.05); *F03D 9/45* (2016.05); *F03D 13/20* (2016.05); *F05B 2240/9112* (2013.01); *Y02B 10/30* (2013.01); *Y02E 10/721* (2013.01); *Y02E 10/725* (2013.01); *Y02E 10/728* (2013.01)

(58) Field of Classification Search
CPC ........ F03D 1/04; F03D 1/0675; F03D 1/0691; F03D 3/002; F03D 3/005; F03D 3/04; F03D 3/0409; F03D 9/34; F03D 9/43; F03D 9/45; F03D 13/20; F03D 1/0633; F03D 1/0641; F05B 2240/14; F05B 2240/217; F05B 2240/221; F05B 2240/91; F05B 2240/911; F05B 2240/9111; F05B 2240/9112; Y02E 10/72; Y02E 10/721

See application file for complete search history.

(56) References Cited

U.S. PATENT DOCUMENTS

| | | | |
|---|---|---|---|
| 9,133,822 B2 * | 9/2015 | Tang | E04D 13/103 |
| 9,203,257 B1 * | 12/2015 | Zaman | H02J 7/0068 |
| 2007/0015452 A1 * | 1/2007 | Chen | F03D 1/04 |
| | | | 454/121 |
| 2011/0187117 A1 * | 8/2011 | Hess | B60K 16/00 |
| | | | 290/55 |
| 2011/0268572 A1 * | 11/2011 | Wilson | F03D 13/10 |
| | | | 416/142 |

(Continued)

FOREIGN PATENT DOCUMENTS

| | | | | |
|---|---|---|---|---|
| CA | WO 2013026127 A1 * | 2/2013 | | F03D 3/005 |
| DE | 9314187 U1 | 1/1994 | | |

(Continued)

*Primary Examiner* — Christopher Verdier
*Assistant Examiner* — Christopher R Legendre
(74) *Attorney, Agent, or Firm* — Michael Soderman

(57) ABSTRACT

The invention relates to a device for converting wind energy into electrical energy. The device is comprised of four legs. One of the legs of the frame has an external recess for mounting on a roof ridge. The frame has a horizontally positioned rotor with a hub and at least two vanes and a generator functionally coupled to the rotor arranged in a central area of the opening formed by the frame. The axis of rotation of the rotor is perpendicular to a plane extending through the legs of the frame.

14 Claims, 4 Drawing Sheets

(56) References Cited

U.S. PATENT DOCUMENTS

| | | | | |
|---|---|---|---|---|
| 2012/0032447 A1* | 2/2012 | Bang-Moeller | ........... | F03D 1/04 |
| | | | | 290/54 |
| 2012/0070293 A1* | 3/2012 | Cwiertnia | ............... | F03D 3/002 |
| | | | | 416/176 |
| 2013/0270937 A1* | 10/2013 | Rasmussen | ............ | H02K 9/005 |
| | | | | 310/54 |
| 2015/0017006 A1* | 1/2015 | Keech | .................... | F03D 3/002 |
| | | | | 416/223 A |
| 2015/0275865 A1* | 10/2015 | Marquardt | ............ | F03D 1/0691 |
| | | | | 415/1 |

FOREIGN PATENT DOCUMENTS

| | | | | |
|---|---|---|---|---|
| DE | 20100512 U1 | 6/2001 | | |
| DE | 202010009981 U1 | 11/2010 | | |
| DE | 202011104180.1 U1 | 1/2013 | | |
| GB | WO 2007007103 A1 * | 1/2007 | ............... | E04D 1/30 |
| GR | WO 2012028890 A1 * | 3/2012 | ........... | F03D 1/0633 |
| WO | 2007007103 A1 | 1/2007 | | |
| WO | 2011056614 A2 | 5/2011 | | |

\* cited by examiner

Figur 5

WIND POWER STATION FOR ROOFTOPS

CROSS-REFERENCE TO RELATED APPLICATIONS

This application claims the benefit under 35 USC 119 of German Application No. DE 10 2014 104 466.5 filed on Mar. 28, 2014; the German application is incorporated by reference herein in its entirety.

BACKGROUND

The invention relates to a device for converting wind energy into electrical energy (wind power station) and a process in which a device of that type is used to generate electrical energy.

The invention is based on the problem of providing a wind power station that can be mounted on buildings and that is simple to manufacture and assemble and therefore economical.

SUMMARY

The invention relates to a device for converting wind energy into electrical energy, comprising a frame made up of four legs; one of the legs of the frame has an external recess for mounting on a roof ridge.

DETAILED DESCRIPTION

The problem underlying the invention is solved with the instant invention. Advantageous design forms of the invention are specified in the dependent claims.

A device for converting wind energy into electrical energy (wind power station) is provided that is comprised of a frame made up of four legs. One leg located at the bottom in the functional position of the device has a recess on the outside as per the invention, and it is therefore opposite the side of the leg that forms the flow-through opening described in more detail below. This recess is used to mount the device on a roof ridge, in particular the roof ridge of a gable roof, and thus of a roof with an edge that is usually horizontal and that tapers towards the sky. The device can consequently, in particular in the case of pantiled roofs, be directly mounted on the ridge batten or the uppermost series of roof tiles as the case may be in the place of a crown tile. The invention consequently provides an unobtrusive wind power station for rooftops.

The recess in the bottom leg of the frame, for instance in the form of a concave arch, a trapezoidal recess or rectangular recess, can also serve in the integration with customary crown tiles if crown tiles are still present after the attachment of one or more wind power stations. The recess preferably involves a concave arch.

The frame of the device is preferably comprised of materials that are customarily used for a roof covering, and thus preferably concrete or clay that is used for the production of roof stones or roof tiles. The frame is especially comprised of lightweight concrete in one embodiment of the invention. In other embodiments, the frame is comprised of the materials plastic, metal, wood, glass or a combination of the above-mentioned materials.

In a preferred embodiment, the device is attached to the roof via struts that connect the frame of the device to a roof batten or rafter with the aid of fastening elements in each case. As a preference, the fastening elements to the frame of the device involve metal butt straps and the fastening elements to the roof batten or the roof rafter involve roof hooks. In a further embodiment, the device has at least one hole in the frame by means of which the device can be screwed onto the ridge batten.

In a preferred embodiment of the invention, the frame of the device is designed to be symmetrical, because this also permits an inflow from both sides. In particular, there is mirror symmetry with a plane that runs through the legs of the frame; the plane is centrally spaced apart from opposite external edges of a leg of the frame in each case.

In a further embodiment of the invention, the frame of the device forms an increasingly smaller opening (flow-through opening) from the edges of the legs of the frame towards the center of the frame, especially towards the above-mentioned plane running through the center. The frame here has concave curves on the inside, preferably favorable for the flow, that preferably have angles that are as small as possible at the inlet and outlet, and thus at the outer edges of the legs of the frame, vis-a-vis the inflow and outflow directions of the wind and that have gradients that are continuous and as low as possible vis-a-vis the central plane. In a preferred embodiment, the frame has a circular cross section on the inside in the above-mentioned plane. The reduction of the flow cross section results in a concentration of the wind passing through, and thus an increase in the wind-flow velocity; the highest flow velocity in the above-mentioned plane arises in the center.

In a further embodiment of the invention, a rotor with a hub and at least two rotor blades (rotor vanes) (especially two or three rotor vanes) and an electric generator functionally coupled to the rotor are arranged in a central area of the opening formed by the frame. The axis of rotation of the rotor here is perpendicular to the plane of the frame described above; a rotor with a horizontal axis (with reference to the functional position of the device) parallel to the direction of flow is therefore involved here.

The rotor is preferably supported with the aid of two roller bearings, especially angular contact ball bearings, that are mounted on both sides of the rotor with a fixed axle; each of the two ends of the axle projects outwards from the respective bearing. The inner races of the two bearings, which are accordingly fixed, are therefore rigidly connected via the axle, whereas their (rotating) outer races support the rotating part of the hub casing (rotor hub) and therefore the entire rotor.

The two ends of the axle are coaxially surrounded by fixed hub casing parts and the suspension in the frame, which is preferably on both sides; the fixed hub casing parts are therefore preferably connected to the frame with the aid of at least one radially extending strut in each case.

In a preferred embodiment, the frame has a recess in its interior for each strut into which the strut is directly inserted or inserted with an intermediate element for vibration decoupling. In particular, the struts involve flat metal sheets, the elements for vibration decoupling involve U-shaped rubber profiles that surround the edges of the metal sheets (pointing towards the frame) and the recesses in the frame involve slots with a corresponding profile for inserting the metal sheets or rubber profiles. In a further embodiment, the struts are fastened in the frame by means of a fastener like a screw.

It turns out that bird strikes, and thus an endangerment of birds and bats, is effectively prevented via a frame around the rotor and braces in front of (and behind) the rotor.

The braces arranged on both sides of the rotor are preferably designed in the form of vanes (guide vanes) of two guide vane wheels. In one embodiment of the device, these guide vane wheels not only serve in the suspension of the rotor, but also in the redirection of the wind flow. The number of guide vanes on the two guide vane wheels is identical on each side of the above-mentioned plane in one design version of the invention. Together with the symmetry of the frame or opening, this has the advantage that the device as per the invention operates equally well regardless of the side of the device that the wind hits.

Each of the two guide vane wheels can, in particular, have one, two, three or four guide vanes. As a preference, each guide vane wheel has four guide vanes; the device therefore has a total of eight guide vanes. The guide vanes counteract swirl loss and can increase the efficiency of the device by up to approx. 30% (with reference to the maximum possible performance coefficient according to Betz).

In accordance with the above-mentioned principle of a symmetrically built device, both the rotor vanes and the guide vanes preferably have vane profiles with double symmetry—the vane profiles are therefore preferably symmetrical along their longitudinal axis and along their cross-wise axis.

It has proven to be beneficial for the profiles of the guide vanes to be designed to be (with respect to the inflow direction) in front of and behind the rotor, straight and in the axial direction with respect to the rotor hub (see FIG. 4). The nearly swirl-free inflow can pass through the front guide vane wheel (inlet guide vane wheel) without a change in swirl because of that. The rear guide vane wheel (outlet guide vane wheel) can remove the swirl induced by the rotor from the flow and consequently minimize the swirl losses. If the direction of the wind is reversed, the inlet guide vane wheel is changed around to the outlet guide vane wheel and vice versa and the direction of rotation of the rotor likewise changes.

The guide vanes are preferably made of galvanized steel. In other embodiments, the guide vanes are made of aluminum, stainless steel, copper, brass or plastic or a combination of the above-mentioned materials.

The rotor vanes are preferably made of fiber-reinforced plastic, especially glass-fiber or carbon-fiber reinforced plastic. In other embodiments, the vanes are made of non-reinforced plastic, metal or wood or a combination of the above-mentioned materials.

Furthermore, there are arrangements in a preferred embodiment of the invention for the rotor vanes and/or the guide vanes to have a serrated front and rear edge and/or at least one turbulator or vortex generator, for instance dimples (see FIG. 5). Other possible turbulators are selected from the group consisting of cross-wise bars, vertical metal sheets, holes, trip wire, sawtooth structures or other surface structuring. Noise is reduced and the efficiency is simultaneously increased with serrated edges and turbulators; in particular, higher lift coefficients are achieved in the case of low Reynolds figures that arise in small wind power stations.

In one embodiment of the device, the electric generator is located in the hub.

Furthermore, the hub can be designed to be hollow so that an electric generator that is located in it can be surrounded by wind flow for cooling purposes. To achieve an even greater cooling effect, the electric generator itself is preferably and additionally also designed to be partially open so that the wind not only flows around it, but also directly through it. The low operating temperatures of an electric generator that is cooled in that way have various positive effects, e.g. longer services lives of insulation materials, or they permit the use of materials that are more heat sensitive and cost effective, and they make greater efficiency of the magnets and armature windings possible. The resistance in copper lines increases by around 0.4% per Kelvin, which means in effect that the losses in the generator with a through-flow of air will be around 32% less (with reference to the overall losses of the generator and in comparison with a closed generator).

In one embodiment of the invention, the generator is a synchronous generator, in particular a synchronous generator with a rotor running on the outside that is energized by a permanent magnet (external rotor). In one embodiment, the generator is arranged in the rotor hub.

To enable a sufficient supply of energy, several devices are preferably arranged immediately next to one another and electrically connected to one another.

In a further aspect, the invention involves the use of the device described here to convert wind energy into electrical energy.

The frame or the frame segments of the device are made of concrete or clay produced with a casting or pressing method in one embodiment of the invention.

The guide vanes are manufactured in one embodiment by stamping out galvanized steel sheets.

The rotor vanes in one embodiment are made of fiber-reinforced thermoplastic via an injection molding method.

BRIEF DESCRIPTION OF THE DRAWINGS

The following are shown in the figures:
FIG. 5: Rotor with three rotor vanes with serrated edges and a structured surface.

DETAILED DESCRIPTION OF THE PREFERRED EMBODIMENTS

Figure 1:
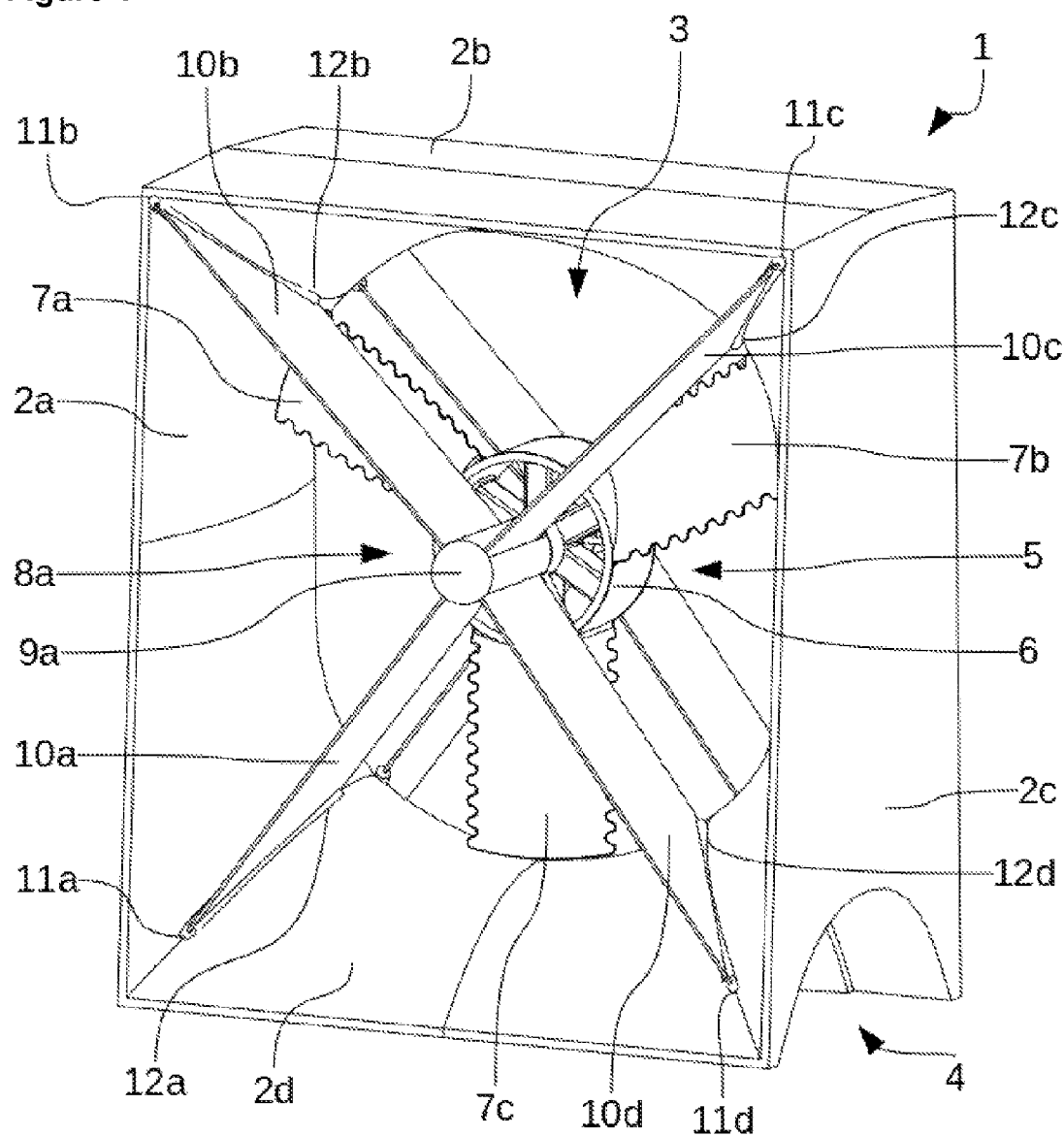
FIG. 1: Structure of a device as per the invention.

The figures are described in detail below:
FIG. 1:
The drawing shows a device 1 for converting wind energy into electrical energy (small wind power station) that is to be attached to the roof ridge of a house. The device 1 has a rectangular frame that is comprised of four segments 2*a*, 2*b*, 2*c*, 2*d* in the embodiment that is shown here. The frame segment 2*d* that is at the bottom in the functional position of the device 1 on the ridge of a roof and the frame segments 2*a*, 2*c* laterally bordering it have a recess 4 that makes it possible to mount the device 1 on the roof ridge.

The frame of the device 1 forms a flow-through opening 3. A rotor 5 whose axis of rotation is horizontal in the functional position of the device 1 is located in the middle of the flow-through opening 3. In the embodiment that is shown here, the rotor 5 has a hub casing 6 (rotor hub) and three rotor vanes 7*a*, 7*b*, 7*c* that are equally spaced apart in a radial fashion on the hub casing 6. A guide vane wheel 8*a* with a hub casing 9*a* (guide vane wheel hub) and four guide vanes 10*a*, 10*b*, 10*c*, 10*d* is arranged in each case on both sides of the rotor 5. The guide vanes extend radially from the guide vane wheel hub 9*a*, 9*b* to slots 11*a*, 11*b*, 11*c*, 11*d* in the frame of the device. The edges of the guide vanes that point towards the frame are surrounded by U-shaped rubber profiles 12*a*, 12*b*, 12*c*, 12*d* that are inserted along with the guide vanes in the slots.

Figure 2:
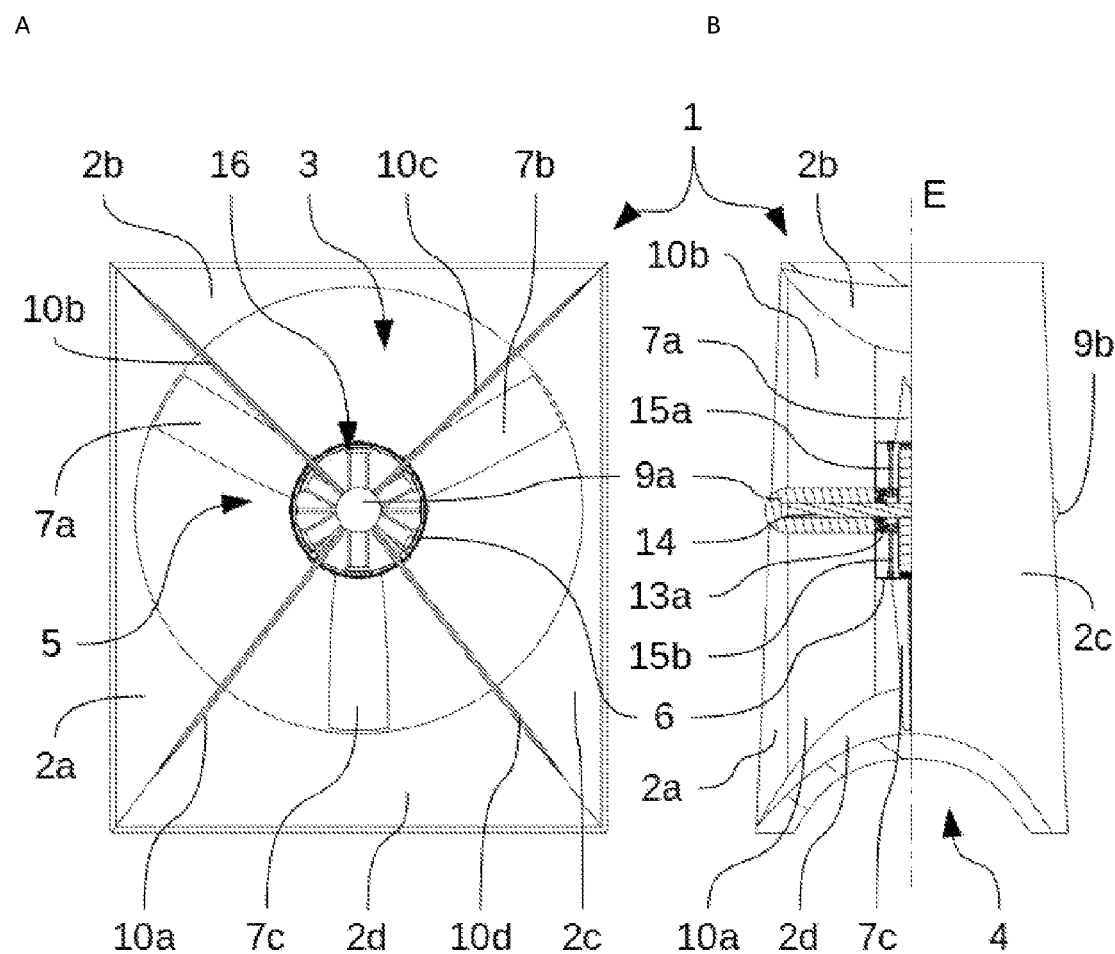
FIG. 2: Front (A) and side (B) views of the device as per the invention in a half section.

FIG. 2:

The drawings of FIG. 2 show an embodiment of the device 1 as per the invention in a front view (FIG. 2A) and in a side view with a half section (FIG. 2B). The plane E shown in FIG. 2B represents the plane (of symmetry) of the device 1 running centrally through the frame.

The device 1 has a frame that is preferably made up of four partial segments 2a, 2b, 2c, 2d. The bottom part of the frame 2d in the functional position and the lateral parts 2a and 2c have a recess 4 for mounting on a roof ridge. A rotor 5, horizontal in the functional position, with a rotating hub casing part 6 (rotor hub) and with three rotor vanes 7a, 7b, 7c equally spaced on the hub casing is centrally arranged in the flow-through opening 3 formed by the frame of the device 1. The rotor is functionally coupled to a generator 16 that serves to generate electricity.

The axis of rotation of the rotor 5 is perpendicular to the plane E, which extends centrally through the frame of the device 1.

The rotor 5 is supported on a fixed axle 14 with the aid of angular contact ball bearings 13a. The rotating outer races of the angular contact ball bearings 13a are connected to the rotor hub 6 via struts 15a or 15b. The inner races of the angular contact ball bearings 13a are firmly arranged on the axle 14, whose two ends are surrounded by the fixed hub casing parts 9a or 9b (guide vane wheel hubs). The suspension of the rotor on both sides, and thus the connection of the two guide vane wheel hubs 9a and 9b to the frame, is provided via struts extending radially in the form of guide vanes 10a, 10b, 10c, 10d.

Figure 3:
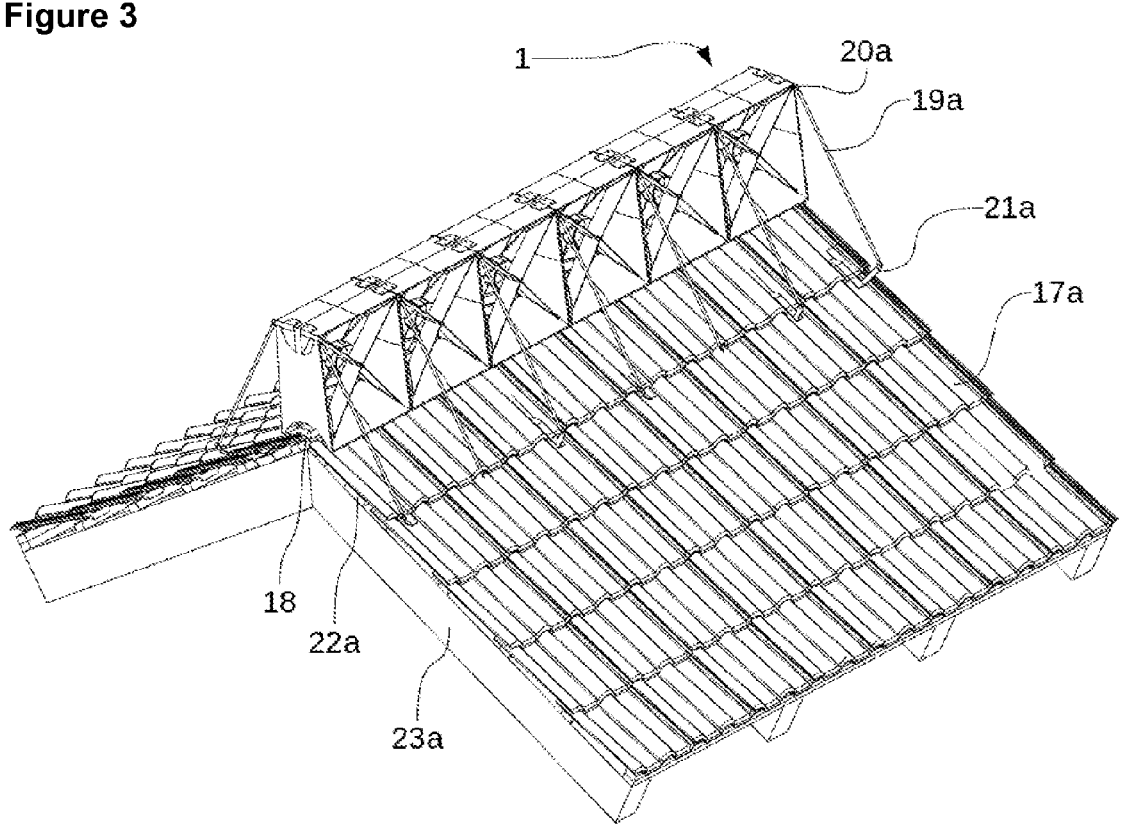
FIG. 3: Structure of devices as per the invention on the roof of a house.

FIG. 3:

The drawing of FIG. 3 shows the arrangement of a plurality of devices 1 as per the invention on the roof ridge of a roof covered with pantiles 17a. The devices 1 are mounted on the ridge batten 18 and are connected to the roof via struts 19a. The struts 19a are connected to one end of the frame of the device 1 with the aid of metal butt straps 18a and are connected at the other end with the aid of roof hooks 21a to a roof batten 22a situated crosswise on the rafters 23a.

The devices 1 are coupled to one another structurally and functionally and form a structural and functional unit.

Figure 4:
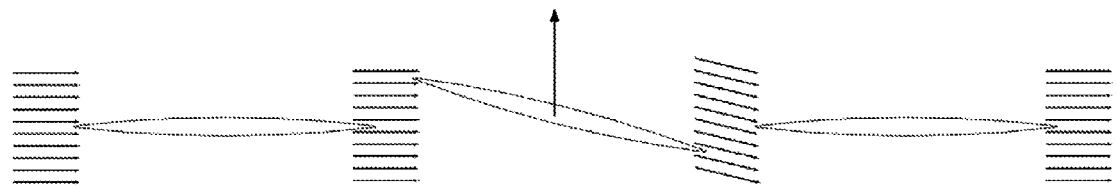
FIG. 4: Flow in a wind power station with straight vanes.
Figure 4:
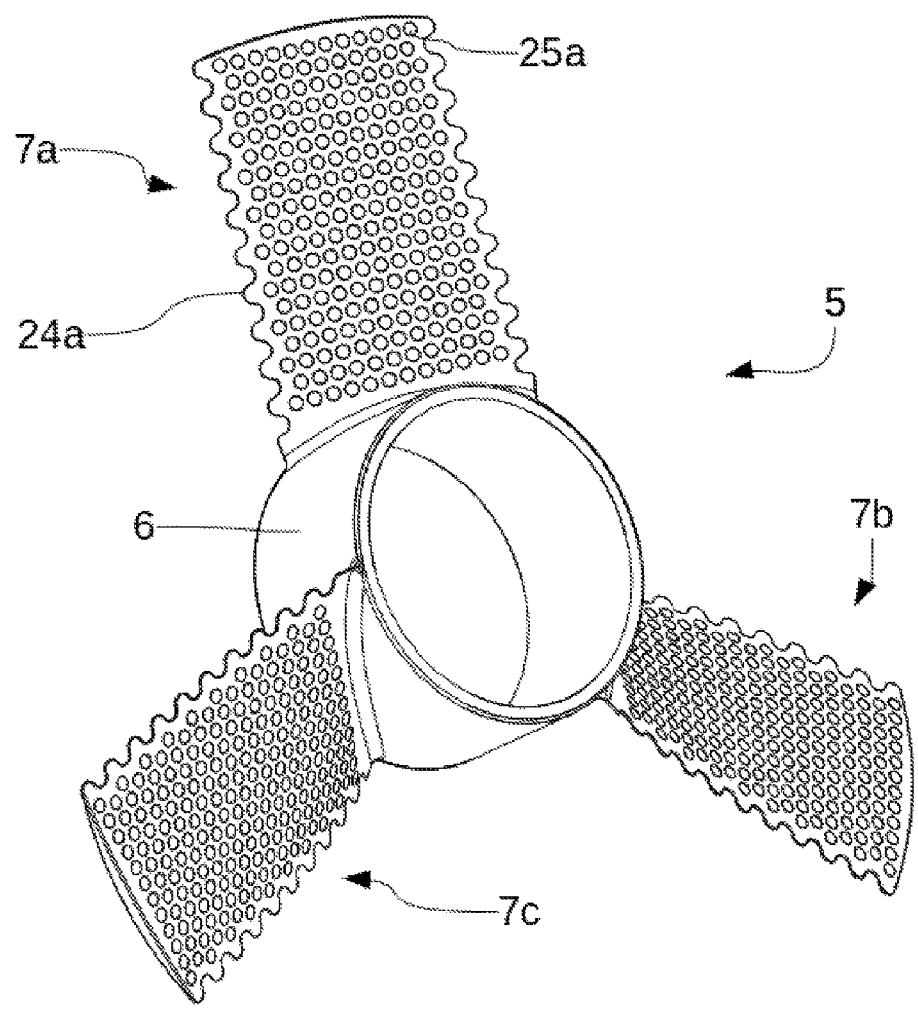

FIG. 4:

The drawing of FIG. 4 shows the flow in a wind power station as per the invention with an inlet guide vane wheel (shown on the left) and an outlet guide vane wheel (shown on the right); the profiles of the guide vanes are designed to be in front of and behind the rotor, straight, and in an axial direction. The inlet guide vane wheel (theoretically) does not have a function to start with, because the incoming wind is (more or less) swirl-free. But the rotor shown in the center in the drawing now induces a (negative) swirl that the outlet guide vane wheel subsequently compensates for. If the direction of the wind is reversed, the inlet guide vane wheel is changed around to the outlet guide vane wheel and the direction of rotation of the rotor likewise changes.

FIG. 5:

The drawing of FIG. 5 shows a rotor 5 with a rotor hub 6 and the rotor vanes 7a, 7b, 7c. The rotor vanes have serrated edges 24a and a surface structured with dimples 25a, which makes especially efficient and low-noise operation of the device as per the invention possible.

LIST OF REFERENCE NUMERALS

1 Device (wind power station)
2a, 2b, 2c, 2d Frame segment
3 Flow-through opening
4 Recess
5 Rotor
6 Rotating part of the hub casing (rotor hub)
7a, 7b, 7c Rotor vane
8a Guide vane wheel
9a, 9b Fixed parts of the hub casing (guide vane wheel hub)
10a, 10b, 10c, 10d Guide vanes
11a, 11b, 11c, 11d Slots in the frame
12a, 12b, 12c, 12d Rubber profiles
13a Angular contact ball bearings
14 Fixed axis
15a, 15b Struts in the rotor hub
16 Electric generator
17a Pantile
18 Ridge batten
19a Struts
20a Metal butt strap
21a Roof hooks
22a Roof batten
23a Rafter
24a Serrated vane edge
25a Dimple

The invention claimed is:

1. Device (1) for converting wind energy into electrical energy, comprising a frame made of four legs (2a, 2b, 2c, 2d), wherein
   one of the legs (2a, 2b, 2c, 2d) of the frame has an external recess (4) for mounting on a roof ridge and
   said frame forms an increasingly smaller opening from the edges of the legs of the frame towards the center of the frame and
   a horizontally positioned rotor (5) with a hub and at least two vanes (7a, 7b, 7c) and a generator (14) functionally coupled to the rotor are arranged in a central area of the opening formed by the frame and
   wherein an axis of rotation of the rotor (5) is perpendicular to a plane (E) extending through the legs (2a, 2b, 2c, 2d) of the frame.

2. Device (1) according to claim 1, wherein the frame has a symmetrical design vis-a-vis the plane (E) extending through the legs (2a, 2b, 2c, 2d) of the frame, wherein the plane (E) is located in the middle of opposite edges of each of the legs (2a, 2b, 2c, 2d) of the frame.

3. Device (1) according to claim 1, wherein the generator (16) is a synchronous generator.

4. Device (1) according to claim 3, wherein the synchronous generator has a rotor that is energized by at least one permanent magnet.

5. Device (1) according to claim 1, wherein profiles of the vanes (7a, 7b, 7c) of the rotor are designed to be symmetrical along longitudinal axes and crosswise axes thereof.

6. Device (1) according to claim 1, further comprising guide vanes that extend radially from the frame, wherein the rotor vanes and/or guide vanes have serrated front and rear edges and/or have at least one turbulator.

7. Device (1) according to claim 1, wherein the frame of the device is connected via struts (19a) to roof battens (22a) or rafters (23a) for fastening to the roof ridge.

8. Device (1) for converting wind energy into electrical energy, comprising a frame made of four legs (2a, 2b, 2c, 2d), wherein
   one of the legs (2a, 2b, 2c, 2d) of the frame has an external recess (4) for mounting on a roof ridge and
   a horizontally positioned rotor (5) with a hub and at least two vanes (7a, 7b, 7c) and a generator (14) functionally coupled to the rotor are arranged in a central area of an opening formed by the frame and wherein an axis of rotation of the rotor (5) is perpendicular to a plane (E) extending through the legs (2a, 2b, 2c, 2d) of the frame,
wherein the device has guide vane wheels (8a) with guide vanes (10a, 10b, 10c, 10d) that extend radially from a guide vane wheel hub to the frame of the device (1).

9. Device (1) according to claim 8, wherein profiles of the guide vanes (10a, 10b, 10c, 10d) are designed to be straight and directed along the axis of rotation.

10. Device (1) according to claim 8, wherein the generator (16) is a synchronous generator.

11. Device (1) according to claim 10, wherein the synchronous generator has a rotor that is energized by at least one permanent magnet.

12. Device (1) according to claim 8, wherein profiles of the vanes (7a, 7b, 7c) of the rotor are designed to be symmetrical along longitudinal axes and crosswise axes thereof.

13. Device (1) according to claim 8, wherein the rotor vanes and/or the guide vanes have serrated front and rear edges and/or have at least one turbulator.

14. Device (1) according to claim 8, wherein the frame of the device is connected via struts (19a) to roof battens (22a) or rafters (23a) for fastening to the roof ridge.

* * * * *